United States Patent Office 2,742,441
Patented Apr. 17, 1956

2,742,441

LATEX-ALUMINOUS CEMENT COATING COMPOSITION

Wilfred J. Mohr, Denville Township, N. J., assignor to The Patent and Licensing Corporation, New York, N. Y., a corporation of Massachusetts No Drawing. Application April 18, 1951, Serial No. 221,737

1 Claim. (Cl. 260—8)

This invention relates to stabilized rubbery butadiene-styrene copolymer latex compositions and is more particularly concerned with flooring and coating compositions made therefrom.

It has heretofore been proposed to make wear resistant coating compositions, flooring compositions, and the like, by combining aqueous dispersions of natural rubber or rubber-like materials, e. g. the so-called synthetic elastomers, with a relatively fine mineral aggregate or filler, such as sand, and a hydraulic cement or binder. In order for the composition to be fully satisfactory, it is necessary that the dispersed particles of rubber or rubber-like material remain substantially dispersed throughout the mass, without any appreciable flocculation or agglomeration until the mass has been applied to the surface being coated and has attained a rigid set. As setting of the composition proceeds, the rubbery material fully agglomerates and the desired wear-resistant, resilient surface is obtained. When Lumnite (aluminous) cement has been used as the binder in this type of composition, difficulty has been experienced in preventing premature agglomeration or flocculation of the rubbery dispersion, and it has been necessary for the dispersion to be highly stabilized before the aluminous cement and sand can be added to it.

A synthetic elastomer dispersion which is highly desirable for use in making coating and flooring compositions of the character indicated is a rubbery butadiene-styrene copolymer latex, commonly known commercially as Buna–S latex or GR–S latex. It is known that casein has a stabilizing action on butadiene-styrene copolymer latex, and while stabilization by means of casein is somewhat satisfactory, the quantity of casein which must be added to achieve the desired stability for mixing with aluminous cement and filler is such that the resulting composition becomes very viscous and difficult to handle, and a homogeneous blend of ingredients, when sand and aluminous cement are added to a thus stabilized latex is achieved only with great difficulty, if at all. Furthermore, when the latex is very viscous, the final aluminous cement coating and flooring composition made from it also lacks the desired fluidity and is difficult to apply. It has seemed necessary, therefore, to effect a compromise and to sacrifice some of the desired stability to permit the fluidity of the latex to be increased to a point which does not too seriously interfere with the homogeneous mixing of the components of the final coating composition. Obviously, this is not a fully satisfactory procedure.

It is an object of the present invention to provide a stabilized butadiene-styrene copolymer latex of improved stability and fluidity suitable for use in preparing aluminous cement coating and flooring compositions.

It is another object of the invention to provide an improved coating and flooring composition comprising aluminous cement, a mineral filler and a rubbery butadiene-styrene copolymer latex.

It is a further object of the invention to provide a flooring and coating composition of the character indicated which has improved fluidity and in which the dispersed rubbery particles have improved stability to premature flocculation and agglomeration.

It is another object of the invention to provide an aluminous cement-butadiene-styrene copolymer latex composition combining optimum fluidity with optimum stability to premature flocculation and agglomeration.

In accordance with the invention, I provide a highly stabilized butadiene-styrene copolymer latex of desirable fluidity containing, as compounding agents therefor, casein and an alkyl aryl sulphonate. A butadiene-styrene copolymer latex to which relatively small quantities of these two agents are added, in accordance with the invention, is resistant to agglomeration or flocculation upon being mixed with aluminous cement and a filler such as sand and yet has a fluidity which permits the various constituents to be rapidly mixed into a homogeneous composition. I have found that these two compounding agents act in combination and have a stabilizing and fluidizing action not obtainable with either of the agents alone. The alkyl aryl sulfonate augments the stabilizing action of the casein and at the same time increases the fluidity of the composition to an extent which greatly facilitates the compounding of the latex with aluminous cement and mineral filler to provide a coating and flooring composition of improved properties compared with butadiene-styrene copolymer latex coating and flooring compositions heretofore proposed. When the butadiene-styrene copolymer latex stabilized in accordance with my invention is mixed with aluminous cement and a finely-divided mineral filler, as mentioned, there is formed a smooth trowellable and sprayable composition suitable for application to wood, concrete, metal or the like. The composition forms a resilient, fireproof surfacing suitable, for example, for industrial floors, runways of airports and the like and as underlayment for other floor coverings such as tile and linoleum.

Butadiene-styrene copolymer latex is an aqueous dispersion of particles of the copolymerization product of monomeric styrene and 1,4-butadiene and is a well-known commercial product ordinarily prepared by emulsion polymerization of these monomeric compounds with the aid of a suitable saponaceous polymerization agent. The butadiene-styrene copolymer latex which may be employed in accordance with my invention, however, may be made by any suitable process and my invention is not confined to the use of a butadiene-styrene copolymer latex prepared in any particular manner. In preparing my coating and flooring composition I preferably employ a butadiene-styrene copolymer latex containing 30 to 60 percent by weight solids, and I have found a butadiene styrene copolymer latex having a solids content of about 49%, e. g. type X–446 GR–S latex, particularly suitable. Another example of a commercial butadiene styrene copolymer latex advantageously used in accordance with my invention is type IV GR–S latex (approx. 40% solids).

The alkyl aryl sulphonate which I employ is a surface active compound having the general formula $$R\text{---}Ar\text{---}SO_3M$$ 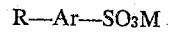

wherein R is an alkyl radical, Ar is a benzene or a naphthalene radical, and M is an alkali metal or the ammonium radical. The alkyl radical preferably contains from 3 to 20 carbon atoms and generally speaking, when Ar is the naphthalene radical, the alkyl radical R may have a smaller number of carbon atoms than when Ar is the benzene radical. Thus, when Ar is the benzene radical, R preferably contains at least about 8 carbon atoms. Specific examples of surface active alkyl aryl sulfonates suitable for use in preparing my improved compositions are sodium octyl benzene sulphonate, sodium octadecyl benzene sulphonate, ammonium hexadecyl benzene sulphonate, potassium decyl benzene sulphonate, sodium isopropyl naphthalene sulphonate, ammonium decyl naphthalene sulphonate, potassium octyl naphthalene sulphonate. My invention is not limited to the specific compounds above enumerated and, furthermore, it is not necessary to use a single alkyl aryl sulphonate, and mixtures of any of the above-mentioned or other alkyl aryl sulphonates are suitably used. I have found particularly advantageous the alkyl aryl sulphonate composition sold under the trade name "Darvan."

Casein is a well-known proteinaceous colloid and is preferably, although not necessarily, used in the form of an alkaline caseinate, made in accordance with known practice by dissolving the casein in an aqueous solution of an alkali, such as potassium hydroxide. Since casein is subject to attack by bacteria and like organisms, the casein is advantageously pasteurized, e. g. by heating it in the aqueous alkaline solution to 185–190° F., and a small amount of a casein preservative is then advantageously incorporated with it. For this purpose I use, for example, chlorinated phenols such as those sold under the trade name "Dowicide," although other well-known casein preservatives, such as beta-naphthol, may be used in place of a Dowicide, and my improved butadiene-styrene copolymer latex is not limited to any particular casein preservative.

Although only relatively small quantities of casein and surface active alkyl aryl sulphonates are necessary for effectively and satisfactorily stabilizing and fluidizing a butadiene-styrene copolymer latex from which may be made an aluminous cement coating and flooring composition of desirable properties, the quantities of casein and sulphonate which can be used in accordance with my invention vary over a wide range. It is generally desirable, however, to employ at least about 5 parts, preferably 8 to 12 parts, of casein, and at least about 4 parts, preferably 4 to 8 parts, of the alkyl aryl sulphonate. The foregoing quantities are parts by weight based upon 100 parts (dry weight) of butadiene-styrene copolymer in the latex used. Greater quantities of casein and sulphonate may be employed but it is generally less desirable to do since the increased quantities tend to decrease the strength of the coating and flooring compositions ultimately formed by compounding the stabilized latex with aluminous cement and mineral filler.

To prepare the stabilized butadiene-styrene copolymer latex, the specified quantity of alkyl aryl sulphonate, preferably as a 10% aqueous solution, and the casein preservative, e. g. Dowicide, are added to the latex and thoroughly mixed with it. The casein, in aqueous solution or suspension is then added to the latex and mixing continued. Water may be added if necessary to make small adjustments in the viscosity of the stabilized latex and small amounts of potassium hydroxide solution may also be added to adjust the pH, if desired. Preferably my stabilized butadiene-styrene copolymer latex has a viscosity between 100 and 500 centipoises Brookfield, and a pH between 10 and 11.

To prepare a flooring or coating composition employing, as a base, a butadiene-styrene copolymer latex stabilized by the addition of casein and alkyl aryl sulphonate, the aluminous cement and a finely-divided filler, such as sand, are added directly to the stabilized latex and thoroughly mixed with it. Aluminous cement, commonly known commercially as Lumnite cement, is prepared from limestone and bauxite and is said to be composed of alumina ($Al_2O_3$) 40%, lime ($CaO$) 40%, iron oxides 15%, and other materials 5%. Aluminous cement is a hydraulic cement and in the presence of an aqueous medium absorbs moisture and ultimately sets to a rigid mass. For best results, therefore, in preparing a coating or flooring composition using my stabilized butadiene-styrene copolymer latex, the aluminous cement and the mineral filler are added to and mixed with the latex substantially at the time the composition is to be applied. Mixing of the various ingredients is readily effected, since the latex has the combination of stability and fluidity which facilitates homogeneous, rapid mixing with the cement and sand, and there is no particular need to prepare the composition any appreciable time before it is to be used. For best results, the compounded coating or flooring composition containing the above-described stabilized butadiene-styrene copolymer latex should contain about 20 to 30 percent aluminous cement, 10 to 20 percent latex, and the balance, i. e. 50 to 75 percent, sand or other like finely-divided mineral filler, all proportions being by weight. These preferred propositions may be varied, however, depending upon the properties desired in the finished composition. Further, while the particle size of the sand or other finely-divided filler employed may vary over a wide range, and is determined at least in part by the surface properties desired in the dried coating layer, I have found that a filler, e. g. sand, of about 60 mesh size is particularly suitable.

The following specific examples, in which all parts are by weight, are further illustrative of my invention without, however, being intended as limiting it in any way.

*Example I*

A typical stabilized, fluid butadiene-styrene copolymer latex prepared in accordance with the invention has the following composition:

| Constituents | Parts (Dry) | Total Parts |
| --- | --- | --- |
| GR-S latex | 100 | 203.5 |
| Casein solution | 10 | 66.7 |
| 10% Darvan solution | 6 | 60 |
| Dowicide solution | 1 | 4 |
| Water | | 23 |
| | 117 | 357.2 |

As previously mentioned, the casein is advantageously added to the latex as the potassium caseinate, which may be formed in accordance with usual practice by swelling casein in water at about 190° F., and then adding to it an aqueous solution of potassium hydroxide in which some of the casein preservative, e. g. Dowicide, has been dissolved. After the Darvan and Dowicide have been added to the latex, the hot casein solution is added and the latex stirred well to insure uniform distribution. Final adjustments of pH and viscosity are then made with water and 45% potassium hydroxide solution.

The stabilized butadiene-styrene copolymer latex thus prepared in accordance with the above-tabulated formulation has a pH of about 10.6, and a viscosity of about 200–300 centipoises Brookfield, and has an optimum fluidity for uniform mixing with aluminous cement and sand. At the same time the latex has high stability toward the cement and sand and is highly resistant to premature flocculation or agglomeration.

*Example II*

A flooring and coating composition is prepared from the stabilized butadiene-styrene copolymer latex of Example I in the following manner:

To 100 parts (wet weight) of the stabilized latex are added with continuous mixing 170 parts by weight of aluminous cement and 375 parts by weight of sand of about 60 mesh size. The materials are thoroughly mixed until a homogeneous mixture is obtained, which requires a very short time. The composition thus prepared is readily trowelable and may be applied by troweling immediately without further treatment. If it is desired to spray the composition, as for application to a wall or the like, it is preferably diluted to a better spraying consistency by the addition of water, for example 25–50 parts by weight for each 645 parts of the composition.

When greater quantities of aluminous cement and/or sand are used per 100 parts of stabilized butadiene-styrene copolymer latex, additional water must generally be added to give the mixture the desired optimum consistency. It is a feature of the latex stabilized in accordance with my invention, however, that it remains stable and resistant to agglomeration and flocculation even upon extensive dilution.

The color of the flooring composition prepared from aluminous cement, sand and my stabilized butadiene-styrene copolymer latex is grayish. Colored compositions are easily prepared by incorporating in the stabilized latex suitable pigments, such as those commercially available in dispersion form and adapted for addition to latices.

While I have thus fully described my invention and pointed out the characteristic features thereof, it will be apparent that various changes and modification may be made without departing from the scope of the invention as defined in the appended claim, and it is intended, therefore, that all matter contained in the foregoing description shall be interpreted as illustrative and not in a limiting sense.

I claim:

A coating composition comprising 10 to 20% by weight of a stabilized butadiene-styrene copolymer latex, 20 to 30% by weight of aluminous cement, and 50 to 75% by weight of sand, said latex containing as stabilizers therefor 8 to 12 parts of casein and 4 to 8 parts of an alkyl aryl sulphonate per 100 parts by weight of the butadiene-styrene copolymer in said latex.

References Cited in the file of this patent

UNITED STATES PATENTS

| | | |
|---|---|---|
| 2,512,697 | Te Grotenhuis | June 27, 1950 |
| 2,535,189 | Benson et al. | Dec. 26, 1950 |
| 2,554,058 | Phipps | May 22, 1951 |
| 2,643,233 | Bennett et al. | June 23, 1953 |
| 2,662,064 | Mead | Dec. 8, 1953 |

OTHER REFERENCES

Nazzaro: Paper Trade Journal, September 28, 1941, vol. 119, No. 13, pages 33 and 34.

Mattiello: Protective and Decorative Coatings, vol. IV, 1944, pages 352 and 353.